(12) United States Patent
Weres

(10) Patent No.: US 7,494,583 B2
(45) Date of Patent: Feb. 24, 2009

(54) ELECTRODE WITH SURFACE COMPRISING OXIDES OF TITANIUM AND BISMUTH AND WATER PURIFICATION PROCESS USING THIS ELECTRODE

(76) Inventor: Oleh Weres, 19 Ravenwood Ln., Napa, CA (US) 94558

( * ) Notice: Subject to any disclaimer, the term of this patent is extended or adjusted under 35 U.S.C. 154(b) by 179 days.

(21) Appl. No.: 11/427,707

(22) Filed: Jun. 29, 2006

(65) Prior Publication Data

US 2007/0000774 A1 Jan. 4, 2007

Related U.S. Application Data

(60) Provisional application No. 60/695,313, filed on Jun. 29, 2005.

(51) Int. Cl.
*C02F 1/461* (2006.01)
(52) U.S. Cl. .................. 205/759; 205/742; 204/290.01; 204/290.12; 204/290.13; 204/290.14
(58) Field of Classification Search ............ 204/290.01, 204/290.12, 290.13, 290.14; 205/742, 759
See application file for complete search history.

(56) References Cited

U.S. PATENT DOCUMENTS

| | | | |
|---|---|---|---|
| 3,801,490 A * | 4/1974 | Welch | 205/625 |
| 4,040,918 A | 8/1977 | Johnson | |
| 4,086,157 A * | 4/1978 | Koziol et al. | 204/290.03 |
| 4,098,669 A | 7/1978 | De Nora | |
| 4,163,706 A | 8/1979 | Horowitz | |
| 4,203,871 A | 5/1980 | Horowitz | |
| 4,272,354 A | 6/1981 | De Nora | |
| 4,353,790 A | 10/1982 | Kanai | |
| 4,456,519 A | 6/1984 | Zöllner | |
| 4,605,482 A | 8/1986 | Shiragami | |
| 4,834,851 A | 5/1989 | Nidola | |
| 4,839,007 A | 6/1989 | Kötz | |
| 5,364,509 A | 11/1994 | Dietrich | |
| 5,419,824 A | 5/1995 | Weres | |
| 6,210,550 B1 | 4/2001 | Nidola | |
| 6,589,405 B2 * | 7/2003 | Weres et al. | 204/290.12 |

\* cited by examiner

*Primary Examiner*—Bruce F Bell
(74) *Attorney, Agent, or Firm*—Oleh Weres

(57) ABSTRACT

An electrode having a valve metal substrate and an electrocatalytic surface composition comprising titanium dioxide doped with bismuth is provided, and an electrolytic water purification process utilizing this electrode, wherein organic substances dissolved or dispersed in water are oxidized and degraded in a nonselective manner with good current efficiency.

18 Claims, 1 Drawing Sheet

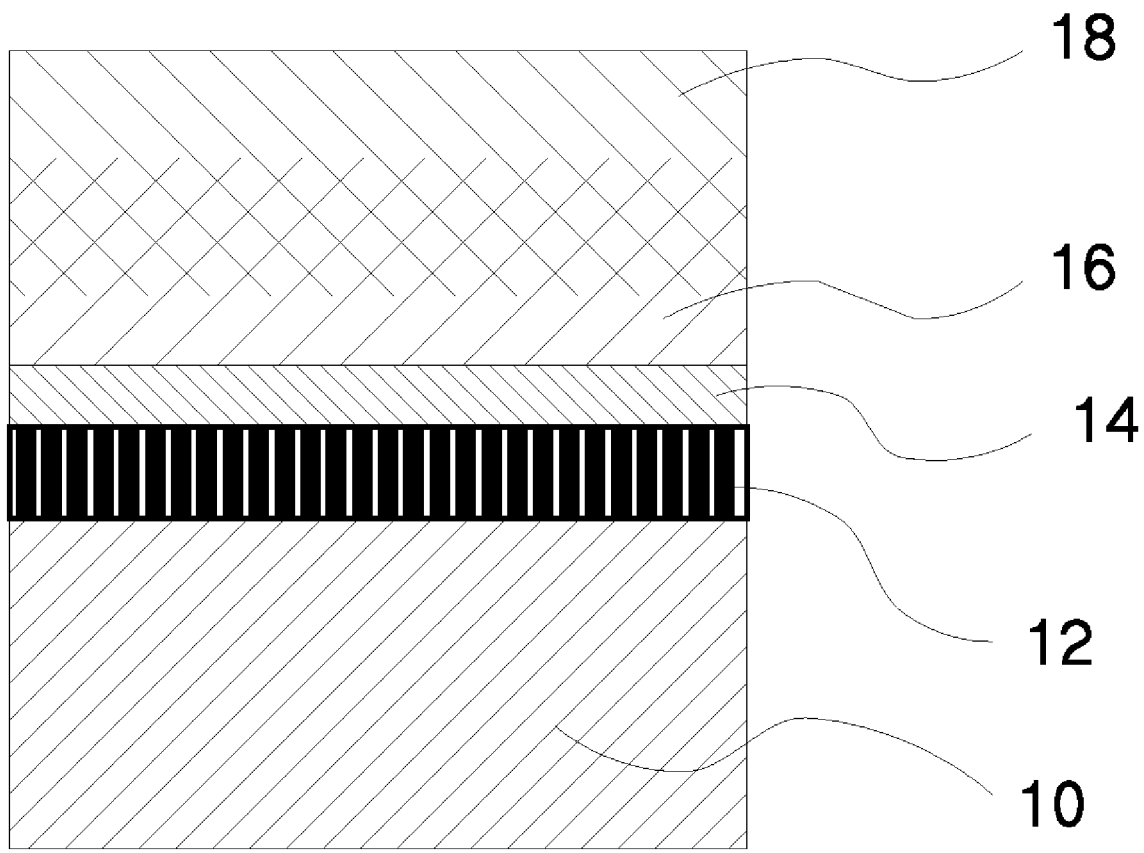

ELECTRODE WITH SURFACE COMPRISING OXIDES OF TITANIUM AND BISMUTH AND WATER PURIFICATION PROCESS USING THIS ELECTRODE

RELATED PATENT APPLICATIONS

Benefit is claimed of U.S. Provisional Patent Application 60/695,313 filed 29 Jun. 2005.

BACKGROUND OF THE INVENTION

1. Field of Invention

An electrode having a valve metal substrate and an electrocatalytic surface composition comprising titanium dioxide doped with bismuth is provided, and an electrolytic water purification process utilizing this electrode, wherein organic substances dissolved or dispersed in water are oxidized and degraded in a nonselective manner with good current efficiency.

2. Prior Art

Electrodes with an electrocatalytic coating of doped diamond are known in the art and recommended for the same application; for example, U.S. Pat. Nos. 6,306,270 and 6,553,916. Production of these electrodes involves chemical vapor deposition or similar processes typically used in the production of integrated circuits; therefore, diamond coated electrodes are expensive to produce and limited to sizes compatible with semiconductor fabrication equipment.

Weres and Hoffmann, U.S. Pat. No. 5,419,824 provided an electrode (anode) for electrolytic water purification comprising a titanium metal substrate with an electrolytic coating comprising titanium dioxide ($TiO_2$) doped with either niobium in the +4 valence state or tantalum in the +4 valence state applied directly to the Ti metal substrate. Weres and O'Donnell, U.S. Pat. No. 6,548,405 provided an electrode wherein an antipassivation coat ("precoat") comprising oxides of iridium and tantalum was applied to the Ti-metal substrate, followed by an intermediate "seal coat" comprising tin dioxide doped with antimony, and finally an outer electrocatalytic coating comprising sintered particles of titanium dioxide doped with niobium in the +4 valence state cemented by a matrix of titanium dioxide doped with antimony. This structure provided good current yield for oxidation of organic compounds, together with long service life.

Kötz, U.S. Pat. No. 4,839,007 provided an electrode comprising a Ti metal substrate with an electrocatalytic coating comprising $SnO_2$ doped with F, Cl, Sb, Mo, W, Nb or Ta (most preferably Sb) applied directly to the Ti metal substrate. Dietrich, U.S. Pat. No. 5,364,509 described an electrode comprising a Ti metal substrate with an antipassivation coating containing iridium, and an outermost electrocatalytic coating comprising $SnO_2$ doped with Sb.

Many electrodes are known comprising a Ti metal substrate with an electrocatalytic coating containing one or more platinum group metals in metallic or oxide form. In some cases, Bi is specified or suggested as an additional constituent in combination with platinum group metals. Bismuth is known to form very stable, electrically conductive mixed oxides of the pyrochlore structure with some of the platinum group metals. Welch, U.S. Pat. No. 3,801,490 provides an electrode with an electrocatalytic coating comprising grains of $Bi_2Ru_2O_7$ or $Bi_2Rh_2O_7$ cemented with a glassy or cryptocrystalline matrix of another metal oxide, preferably $TiO_2$. Welch teaches that the titanium dioxide serves as an unreactive cement that strengthens the coating, and that, while an electrocatalytic coating consisting entirely of the precious metal pyrochlore would provide an operative electrode, preferably the precious metal pyrochlore should comprise 10 to 80 weight percent of the electrocatalytic coating, with the balance $TiO_2$. While primarily recommending this electrode for chlorine generation or metal recovery applications, Welch also teaches that it may be used to oxidize organic compounds, identifying as an example the product specific, partial oxidation of propylene to propylene oxide or propylene glycol. Welch's examples illustrate methods of producing these electrodes which ensure that the (Ru,Rh)—Bi pyrochlore and the titanium dioxide phase form distinct phases with essentially no mixing of Ti with the other metals. Nidola, U.S. Pat. No. 6,210,550 provided an electrode comprising a titanium metal substrate with an electrocatalytic coating essentially comprising $IrO_2$ and $Bi_2O_3$, optionally also containing $SnO_2$ and other metal oxides.

Koziol, U.S. Pat. No. 4,086,157 provided an electrode comprising a Ti-metal substrate, a base layer chosen to prevent passivation of the substrate, and an electrocatalytic layer believed to comprise at least two distinct phases: (1) a stable, electrically conductive metal oxide phase having spinel or similar crystal structure, and (2) a cementing matrix comprising titanium dioxide and/or tantalum pentoxide doped with up to 28 mol percent Nb, W, Mo, Sb or Sn to make the matrix electrically conductive. To ensure a sufficient content of the spinel or similar metal oxide phase, the aggregate concentration in the electrocatalytic coating as a whole of the oxides of the elements Ba, Ga, Ge, Pb, Bi, Se, Te, Cu, Cd, the rare earth elements, Mn, Fe, Co and Ni was specified to be greater than about 50 mole percent. No example including Bi in the coating was provided, nor is there any suggestion that combining the oxides of Bi and Ti alone would give an operative electrode. It is known in science and the art that only a few metals (notably Mn, Fe, Co and Ni) form spinels with no other metal present, and Bi that doesn't enter spinel phases due to the much larger radius of the $Bi^{+3}$ cation.

De Nora, U.S. Pat. No. 4,272,354 provided an electrode comprising a Ti substrate coated with a solid solution of tin and bismuth oxides, preferably in the mole ratio 9:1 to 4:1 by weight of the respective metals. This mixture of Sn and Bi oxides can serve as the electrocatalytic layer itself, or else as an intermediate layer with an electrocatalytic layer containing platinum group metals applied over it. Also, De Nora teaches that the oxides of Sn and Bi may be added to an electrocatalytic coating comprising mostly the oxides of Ru, Ti and Co; examples are provided wherein the relative metal weight fractions of Ru:Ti:Sn:Bi:Co are 45:(35-55):(1-16):(0-5):(0-6). De Nora neither teaches nor suggests the combination of Ti and Bi in the absence of Ru or another platinum group metal in an amount sufficient to favor generation of chlorine.

SUMMARY OF THE INVENTION

An electrode is provided, comprising a titanium metal substrate, an antipassivation layer (precoat) containing iridium that is applied directly to the Ti substrate, optionally an intermediate layer (seal coat) comprising the oxides of tin and bismuth, and an outermost electrocatalytic coating comprising the oxides of titanium and bismuth. A water treatment processes utilizing these electrodes is also provided, whereby organic substances and oxidizable inorganic substances dissolved or dispersed in the water are oxidized and destroyed with good efficiency, while microorganisms are destroyed by active chlorine which is produced as a byproduct by oxidation of chloride ion commonly present in the water.

Objects and Advantages

The electrodes of the present invention are well-suited to serve as the anode for electrolytic purification of water. Like the electrodes earlier provided by Weres and Hoffman, and Weres and O'Donnell, the electrodes of the present invention are able to oxidize in a nonselective manner and with good current yield fairly unreactive organic substances (for example, propylene glycol) dissolved or dispersed in water. In this application, they are superior to the many electrodes known in the art with electrocatalytic coatings that include platinum group metals or conductive metal oxides such as cobalt spinels; such prior art electrodes were specifically developed to oxidize chloride ion in preference to other substances, and their current efficiency in oxidation of organic substances typically is small.

No metals besides Ti and Bi need be present in the outermost electrocatalytic coating of the electrodes of the present invention. In particular, it is preferred that platinum group metals and other transition metals that form electrically conductive oxides (for example, Mn, Fe, Co, Ni) not be present in the electrocatalytic coating, because their presence would decrease current efficiency in relation to oxidation of organic substances, while increasing production costs and possibly decreasing service life.

A variety of nonelectrochemical methods for purifying water by nonselective oxidation of organic substances are known in the chemical art under the general name of "advanced oxidation processes." Most commonly, the combination of hydrogen peroxide and ozone, or either compound with UV light is used to produce hydroxyl free radical OH., which rapidly reacts with and degrades organic substances. The electrodes of the present invention are equally effective in oxidizing organic substances dissolved or dispersed in water, whereby their use in this capacity can properly be called "electrochemical advanced oxidation." A water purification process using the electrodes of the present invention has a large advantage over the nonelectrochemical advanced oxidation processes because hydrogen peroxide and ozone are not needed, and much less electrical energy is consumed in relation to the amount of organic material oxidized; therefore, organic contaminants can be degraded with starting with initial concentrations much larger than would be practical using the nonelectrochemical advanced oxidation processes. Oxidizable inorganic species such as cyanide, azide or sulfide are also oxidized, as well as colloidal organic materials dispersed in the water.

Partial electrochemical oxidation of organic compounds is well-established as a method of organic synthesis, and anodes with an electrocatalytic coating containing platinum group metals are commonly employed. An oxidation process used to synthesize compounds must be selective, and must not further oxidize the desired reaction product; for example, propylene glycol produced by oxidizing propylene. Therefore, electrodes well suited for electrochemical oxidation as a synthetic procedure are poorly suited for electrochemical advanced oxidation, and vice-versa. Likewise, an electrode with electrocatalytic coating that contains enough of a platinum group metal or another conductive metal oxide to favor generation of chlorine will be ill-suited for electrochemical advanced oxidation.

The electrodes of the present invention have several advantages over the prior art electrodes used in electrochemical advanced oxidation and other applications:

1. They are easy to manufacture, because all steps in making the preferred embodiment are performed in air with no need for an inert gas, carbon dioxide or hydrogen atmosphere.
2. No organic solvents need to be used in producing these electrodes, and in one embodiment, the most corrosive solution employed in the electrode coating process contains just 0.5N HCl.
3. The electrocatalytic surface layer contains no toxic elements (for example, Sb) which might be released to the water being purified using prior art electrodes.
4. The only precious metal required is some amount of iridium in the precoat, minimizing production cost.
5. The electrocatalytic surface coating produced is well adherent and hard, providing good resistance to physical degradation of the electrode in service. (Rapidly peeling cellophane tape from the coated surface of an electrode does not damage or remove the coating, and a fingernail barely touches it.)
6. Cell voltage is reasonably low, saving energy.
7. Current yield and the reaction kinetics are good, also saving energy and increasing system capacity.
8. The electrodes have good service life.
9. The electrodes are much cheaper to produce than diamond coated electrodes, and may be produced throughout the range of sizes required for practical industrial application using simple dip-dry-bake procedures.

Definition of Terms

"Current yield" is proportional to the amount Chemical Oxygen Demand (COD) removed from the water in the electrolytic cell divided by the amount of electrical charge passed through the cell. An "ideal" anode with current yield $\epsilon=100\%$ would remove 8.0 g COD per one mole of electrons=96,483 Coulombs passed through the cell. The technique used to determine the current yield in the Examples is described towards the end of this specification; propylene glycol is used as the substrate, in a 21 mM solution of NaCl.

In the claims, the phrase "significantly decrease current yield" means to decrease the current yield as defined and measured above by one-fourth or more, compared to what it would have been in the complete absence of platinum group metals and other harmful constituents from the electrocatalytic coating; e.g., current yield decreasing from 28% to no more than 21%.

"Harmful constituents" refers to the spinel oxides of Mn, Fe, Co and Ni and other transition metal oxides, addition of which to the electrocatalytic coating would decrease current yield.

The concentrations ranges and mole fractions referred to in the claims are understood to exclude any chemically inert, nonconductive substances that may be added to the electrocatalytic coating to increase strength, increase surface roughness or for another purpose; for example, silica, alumina, zirconia or fluorocarbon resins.

"Mole fraction" refers to the number of moles of a given metallic elements present in a composition divided by the aggregate number of moles of all metals present; that is, oxygen, residual chloride, etc., are ignored.

"Valve metal" refers to any one of Ti, Nb, Ta, Zr or W, including alloys thereof.

"Platinum group metal" refers to any one of Ru, Rh, Pd, Os, Ir and Pt, to the oxides of these metals, and to mixtures of these metals and their oxides.

DRAWING FIGURE

The FIGURE depicts the sequence of coating layers applied to the titanium metal substrate to produce the electrodes of the present invention.

DESCRIPTION OF THE DRAWING

The FIGURE depicts the sequence of coating layers applied to the titanium metal substrate 10 to produce the preferred embodiment of the present invention. The precoat (antipassivation) layer 12, comprising a mixture of iridium dioxide ($IrO_2$) and tantalum pentoxide ($Ta_2O_5$), is applied directly to prepared Ti metal substrate 10. Alternatively, precoat 12 can comprise a mixture of $IrO_2$ with either $SnO_2$ or $Bi_2O_3$ or both. Other antipassivation layer compositions are know in the art. The intermediate seal coat 14, comprising $SnO_2$ doped with Bi, is applied next, covering precoat layer 12. The presence of seal coat 14 is optional but preferred, because it improves adhesion and durability of the overlying electrocatalytic coat and improves current yield. The slurry coat 16, comprising particles of titanium dioxide optionally doped with bismuth, niobium in the +4 valence state, tantalum in the +4 valence state, or antimony is applied over the sealing coat. Finally, the overcoat 18, comprising $TiO_2$ doped with $Bi_2O3$ is applied over the slurry coat. Slurry coat 16 and overcoat 18 together form the electrocatalytic outer layer of the electrode. The slurry coat 16 and overcoat 18 are depicted as overlapping and interpenetrating, because the overcoating solution soaks into the slurry layer and cements it, as well as covering it.

Operation of the Invention

The multilayer coating sequences of several electrodes that exemplify the invention and several comparison electrodes are summarized in Table 1. The current yield measured, and the cell voltage are also presented. The test and measurement procedures are described in detail towards the end of this specification.

The test results summarized in Table 1 illustrate the range and benefit of the invention.

1. Examples 1 through 9 correspond to the preferred embodiment of the invention: a Ti metal substrate with the following sequence of coating layers applied: (1) a precoat containing Ir, (2) a sealing coat comprising $SnO_2$ doped with Bi, (3) slurry comprising $TiO_2$ optionally doped with Bi, and (4) overcoat essentially comprising the oxides of Ti and Bi.
2. The chemical composition of the powder used to make the slurry makes little difference. Electrodes made using undoped $TiO_2$ powder, or $TiO_2$ powder doped with 4 mole % Bi or 4 mole % $Nb^{+4}$ gave comparable results with no apparent correlation with the composition of the powder. Using a sintered powder of $SnO_2$ in place of a sintered powder of $TiO_2$ would produce an operative electrode as well. Thus, the difference in current yield among the electrodes in the Examples is primarily related to the overcoat composition.
3. Good current yield was obtained over a wide range of Bi concentrations in the overcoat, spanning 4 mole % to 50 mole %. In fact, the minimum Bi concentration required is even smaller. In Example 5 (small electrode M), the slurry and overcoat were both pure $TiO_2$ with no Bi added, yet the electrode gave 25% current yield and operated at a normal voltage. A spot test for Bi indicated the presence of Bi in the surface of the electrode. The only source of Bi in this electrode was the seal coat, which was formulated to contain 10 mole % Bi. Apparently, part of the Bi in the seal coat migrated up into the overcoat during the coating process, providing a enough Bi doping in the surface composition to give a functional electrode. The maximum concentration of Bi in the surface would result if Bi were distributed throughout the entire volume of seal coat and entire volume of overcoat with uniform concentration. Combining the coat weight data in Table 2 with the known densities of $TiO_2$ and $SnO_2$ indicates a maximum concentration of Bi in the surface composition equal to 2.5 mole %. The actual concentration of Bi at the surface of the electrode was certainly less than this, suggesting that as little as 1 mole % Bi in the overcoat at the surface of the electrode would give a functional electrode.
4. An electrode with no Bi in its surface composition would not work well. In Comparative Example C6, small electrode M2 was made with undoped slurry and undoped overcoat, and a seal coat doped with Sb; therefore, no Bi was present. This electrode gave 4% current yield, less than recorded with Comparative Example C1, where small electrode B1 received a precoat only. Probably, the small current yield recorded with small electrode M2 was due to current leaking through from the precoat.
5. The compositions giving the highest current yields appear to lie in the range 10-33 mole % Bi in the overcoat, which approximately corresponds to 6-16 mole % Bi in the slurry and overcoat combined. The actual mole fraction of Bi should be determined for each specific application in view of the trade-off of current yield (which increases with % Bi) versus production cost (which also increases with % Bi) and service life (which probably decreases with increasing % Bi).
6. Comparative Examples C1 and C3 represent prior art electrodes; these electrodes both had current yield substantially smaller than the electrodes of the present invention. Also, these electrodes have potentially toxic metals (Ir and Sb, respectively) exposed at the surface of the electrode, whereby the possibility of contaminating the water being "purified" exists. Small electrode B1, with precoat only, is likely to have much shorter service life than the electrodes of the present invention, because the precoat contacts the electrolyte with nothing over it to protect it. Small electrode A was made using a coating solution in n-butanol, which is a much more expensive and much more hazardous coating method than the all-aqueous chemistry of the present invention.
7. There is no apparent correlation of cell voltage with composition over the range of compositions that represent the preferred embodiment of the invention, Examples 1 to 9 in Table 1. Also, these preferred electrodes operate at cell voltage equal to or slightly smaller than electrodes with no slurry coat (Comparative Examples C1, C2 and C3). This improvement is surprising and unexpected, because, in principle, increased generation of hydroxyl free radical and therefore higher current yield would be expected at higher anodic potential and, therefore, larger cell voltage. The modest cell voltage enabled by the electrodes of the present invention reduces energy costs, and is conducive to increased service life; if the precoat and seal coat sink current at the same voltage as the outermost overcoat, there will be no bunching of current at surface defects where precoat or overcoat is exposed, and therefore no expectation of accelerated damage in those places.
8. Comparative Example C4, where small electrode J was made without a seal coat, indicates that inclusion of a seal coat is not essential (because a substantial current yield was obtained without a seal coat), but is beneficial (because the current yield is smaller in its absence). It is possible that further improvements in the slurry and overcoat will increase current yield to the point that a seal coat is no longer necessary.

9. Comparative Example C7, wherein small electrode NP1 made with no precoat rapidly failed indicates that, as a practical matter, a precoat containing Ir or another platinum groups metal or metal oxide should be included in the coating sequence. However, there are prior art electrodes with no precoat (for example, Kötz, U.S. Pat. No. 4,839,007) and it is possible that some way of producing a useful electrodes with the present surface composition but without a precoat (that is, without an "antipassivation layer") might be developed.

10. It is believed that the slurry coating applied to the electrodes of the present invention improve current yield and service life by producing a microcrystalline, ceramic structure in the coating through which microfractures propagate poorly.

11. In Example 9, small electrode D1 received an overcoat that contained Na as well as Ti and Bi, but gave essentially the same current yield as the other electrodes. This result demonstrates that the invention is not limited to surface compositions that comprise titanium dioxide and bismuth oxide alone to the exclusion of additional metal oxides.

TABLE 1

Summary of Examples

| No./Elec. | Precoat | Seal Coat | Slurry | Overcoat | $\epsilon$ | $V_{cell}$ |
|---|---|---|---|---|---|---|
| Small Electrodes | | | | | | |
| 1 G | Ir-27Sn-3Bi/0.5 | SnO$_2$-10Bi/0.5 | TiO$_2$-4Bi | TiO$_2$-10Bi | 26 | 2.53 |
| 2 BC | Ir-30Sn/0.5 | SnO$_2$-10Bi/0.5 | TiO$_2$-4Bi | TiO$_2$-10Bi | 30 | 2.56 |
| 3 E2 | Ir-27Ta/4 | SnO$_2$-10Bi/0.5 | TiO$_2$-4Bi | TiO$_2$-10Bi | 26 | 2.52 |
| 4 G2 | Ir-27Sn-3Bi/0.5 | SnO$_2$-10Bi/0.5 | Pure TiO$_2$ | TiO$_2$-10Bi | 29 | 2.46 |
| 5 M | Ir-27Ta/4 | SnO$_2$-10Bi/0.5 | Pure TiO$_2$ | Pure TiO$_2$ | 25 | 2.43 |
| 6 GG2 | Ir-27Ta/4 | SnO$_2$-10Bi/0.5 | TiO$_2$-4Bi | TiO$_2$-33Bi | 36 | 2.54 |
| 7 U | Ir-27Ta/4 | SnO$_2$-10Bi/0.5 | TiO$_2$-4Bi | TiO$_2$-40Bi | 31 | 2.46 |
| 8 R | Ir-27Ta/4 | SnO$_2$-10Bi/0.5 | TiO$_2$-4Bi | TiO$_2$-50Bi | 24 | 2.46 |
| 9 D1 | Ir-27Ta/4 | SnO$_2$-10Bi/0.5 | TiO$_2$-4Bi | TiO$_2$-25Bi-25Na | 29 | 2.46 |
| 10 H1 | Ir-27Sn-3Bi/0.5 | SnO$_2$-10Bi/0.5 | TiO$_2$-4Nb ("Blue") | TiO$_2$-4Bi | 23 | 2.43 |
| Set of 3 large electrodes | | | | | | |
| 11 3X1 | Ir-27Sn-3Bi/0.5 | SnO$_2$-10Bi/0.5 | TiO$_2$-4Bi | TiO$_2$-10Bi | 27 | n/d |
| Comparative Examples - Small Electrodes | | | | | | |
| C1 B1 | Ir-27Ta/4 | | None | | 7 | 2.53 |
| C2 K2 | Ir-27Ta/4 | SnO$_2$-10Bi/0.5 | | None | 13 | 2.58 |
| C3 A | Ir-37Ta/3 | | SnO$_2$-11Sb in n-Butanol | | 18 | 2.79 |
| C4 J | Ir-27Sn-3Bi/0.5 | None | TiO$_2$-4Bi | TiO$_2$-10Bi | 19 | 2.48 |
| C5 AM | Ir-27Sn-3Sb/0.6 | SnO$_2$-10Sb/1.7 | TiO$_2$-4Sb | TiO$_2$-12Sb | 10 | 2.50 |
| C6 M2 | Ir-27Ta/4 | SnO$_2$-10Sb/1.7 | Pure TiO$_2$ | Pure TiO$_2$ | 4 | 2.51 |
| C7 NP1 | None | SnO$_2$-10Bi/0.5 | TiO$_2$-4Bi | TiO$_2$-10Bi | Failed | |

TABLE 2

| | Weight of Each Layer Applied (g m$^{-2}$) | | | | | |
|---|---|---|---|---|---|---|
| No./Elec. | Precoat | Seal C. | Slurry | O.C.-1 | O.C.-2 | Slurry + O.C. |
| Small Electrodes | | | | | | |
| 1 G | n/d | n/d | 6.7 | 2.2 | 1.5 | 10.4 |
| 2 BC | 0.62 | 1.10 | 6.6 | 3.0 | 2.0 | 11.7 |
| 3 E2 | 3.8 | 3.6 | 6.2 | 3.0 | 2.3 | 11.5 |
| 4 G2 | n/d | n/d | 5.6 | 3.0 | 1.8 | 10.4 |
| 5 M | 4.3 | 3.1 | 6.2 | 3.4 | 2.0 | 11.5 |
| 6 GG2 | n/d | 3.1 | 6.3 | 3.8 | 2.0 | 12.1 |
| 7 U | 4.7 | 3.2 | 5.8 | 3.0 | 3.6 | 12.4 |
| 8 R | n/d | 2.7 | 6.5 | 3.6 | 2.0 | 12.1 |
| 9 D1 | 4.7 | 3.2 | 5.8 | 2.9 | 2.6 | 11.3 |
| 10 H1 | 0.75 | 3.4 | 8.0 | | none | 8.0 |
| Set of 3 large electrodes | | | | | | |
| 11 3X1 | 0.61 | 1.44 | 4.4 | 3.0 | n/d | n/d |
| Comparative Examples - Small Electrodes | | | | | | |
| C4 J | 0.62 | none | 6.6 | 2.7 | 2.1 | 11.4 |
| C5 AM | 0.62 | 0.34 | 6.6 | 3.1 | 1.6 | 11.2 |
| C6 M2 | 4.1 | 0.55 | 6.4 | 2.7 | 1.9 | 11.1 |

Notes to the Tables:
$\epsilon$ = the current yield (%), determined using propylene glycol in 21 mM NaCl electrolyte
$V_{cell}$ = cell voltage measured at current density = 81 A m$^{-2}$ at the surface of the anode; IR term has been subtracted out
n/d = "Not determined" or "not recorded"

NOTES TO THE EXAMPLES

In most cases, the "Standard Coating Procedure" described in the section with that title below was followed. The short hand notation used to describe the coating sequence is explained in that section as well. The following notes are limited to documenting substantial deviations from the standard coating procedure.

Example 10

Small Electrode H1

Blue slurry made using TiO$_2$ powder doped with Nb$^{+4}$; TiO$_2$ overcoat doped with Bi. The coating sequence was:
(anodize, ad, 5@450)
2×(PC, ad, 5@450)

2×(2×(SC, ad), 5@450)
4×(S1, ad, 5@250, OC/25, ad, 5@250)
1×(OC/1, ad, 10@250, H₂O, 10@250)

At this point, the electrode was broken in overnight. The electrode was subsequently baked again at a higher temperature under helium to prevent oxidation of the blue powder.

(10@425 under He)
1×(OC/25, ad, 10@425 under He)

Example 11

Set of Three Large Electrodes 3X1

A set of three rectangles of T-Gr.2, each one measuring 8×18 inches, 0.020 inches thick, coated on both sides.

Comparative Example C1

Small Electrode B1

This electrode had only the precoat (that is, "antipassivation layer") applied.

Comparative Example C2

Small Electrode K2

This electrode had only the precoat and the seal coat applied.

Comparative Example C3

Small Electrode A

This electrode represents the prior art in respect to an electrocatalytic coating comprising $SnO_2$ doped with Sb, and follows as closely as was practical the coating procedure taught by Dietrich in U.S. Pat. No. 5,364,509, Example 1. The precoating solution was an aqueous solution of $H_2IrCl_6$ and $TaCl_5$ in HCl as taught by de Nora et al. in U.S. Pat. No. 3,878,083. In this comparative example only, the electrocatalytic coating comprising $SnO_2$ doped with 11 mole % Sb was applied using a coating solution based on n-butanol as solvent rather than water, applied directly over the precoat Comparative Example C4

Small Electrode J

Differs from G by absence of sealing coat.

Comparative Example C5

Small Electrode AM

Differs from G by use of Sb instead of Bi in all coating compositions. Note the small weight gain as compared to electrodes with $SnO_2$—Bi sealing coat, indicating a much thinner and probably less beneficial seal coat produced using the $SnO_2$—Sb composition in this Example.

Comparative Example C6

Small Electrode M2

Same precoating sequence and seal coating sequence as M, except that seal coating solution contained Sb in place of Bi. No Bi in slurry or overcoating solution.

Comparative Example C7

Small Electrode NP1

Differs from G by absence of precoat. Ti rectangle cut from virgin Ti-Gr.2, 1 mm thick and sanded; not previously coated, no previous contact with Ir chemistry. Failed quickly (less than one hour) by passivation of Ti substrate when break-in operation was attempted following completion of first overcoating sequence.

Standard Coating Procedure

When coating large electrodes, it is preferred that they be dried and baked in a horizontal orientation to minimize runoff and uneven distribution of the coating. Preferably, slurry should be applied to large electrodes by pouring it over each surface of the electrode while holding the electrode at a small angle from horizontal.

Preparation of Ti Metal Substrate

The substrate used to make a small electrode was a rectangle of Ti-Gr.2 sheet 0.020 inch=0.50 mm thick, measuring 2.25×5.75 inches=57×146 mm Clean surface of Ti metal substrate for the anode using SiC sandpaper (120 to 240 grit preferred), wetted with water. If cutting oil present or dirty, scrub with kitchen cleanser and mild plastic scouring pad. Wash using dishwashing detergent, rinse, pat dry with paper towel.

Precoat and Seal Coat—Procedure 1

This procedure was used to apply precoat and slurry coat in examples utilizing the low acid precoating solutions containing Sn; that, is Ir-27Sn-3Bi/0.5 and variations thereof. Because these precoating solutions are dilute and only three layers were applied, the resulting precoat is thin. A thicker precoat is readily provided by increasing the concentration of the precoating solution, and increasing the number of layers of precoat applied. The low acid precoating solutions are preferred in application to Ti-fiber electrode substrates, as described in U.S. Pat. No. 6,589,405 and Publication US 2004/0003993 A1. With a Ti-fiber substrate, lower acidity in the precoating solution is preferred to decrease the risk of the fiber catching fire while being coated. Also, Ti-fiber electrodes usually will be operated at a lower current density than would a flat plate electrode, whereby there is less need for a tough, thick antipassivation layer.

Anodize in 30 mM $H_2IrCl_6$ for 2 minutes at 68 A m$^{-2}$, drain, but don't dry.

3×(PC, ad, 10@450)

That is, apply precoating solution using plastic pipette, hot air dry, and bake 10 minutes in air at 450° C., allow to cool, and execute this sequence a total of three times.

3 ×(SC, ad), 10@425

That is, apply seal coating solution and air dry dry three times, and finally bake 10 minutes in air at 425° C. When cool, wash under running water and dry before proceeding to apply slurry coat.

Precoat and Seal Coat—Procedure 2

This procedure was used to apply precoat and slurry coat in examples utilizing the high acid precoating solutions containing Ta; that is, Ir-27Ta/4 and variations thereof. It provides a thicker precoat and a thicker seal coat, which are to be preferred in application to a flat plate anode that is to be operated at a larger current density necessitating better protection against passivation. Even thicker coatings can easily be applied simply by increasing the number of applications at each stage.

Sand and clean the Ti plate, but do not anodize.

1×(PC, ad, 1 hour@525)

5×(PC, ad, 10@525)

That is, bake for 1 hour after the first application of precoat, but only 10 minutes on each subsequent application.

2×(2×(SC, ad), 10@425)

That is, a seal coat applied a total of four times, and baked at 425° C. after the second and fourth application. When cool, wash under running water, rub with a wet paper towel to decrease surface gloss, and dry before proceeding to apply slurry coat.

Slurry Coating Sequence

7×(Slurry, ad, OC/25, ad, 5@250)

That is, apply slurry, air dry, apply overcoating solution diluted 1:25, air dry, and bake in air at 250° C., allow to cool, and repeat this entire sequence seven times.

The number of slurry coats applied was typically seven, but adjusted as needed to provide the proper coat thickness which was indicated by complete surface coverage as viewed at 200× on a metallographic microscope, but not so thick as to cause a significant amount of the coating to flake off. The range of acceptable slurry coat weight encompasses than the range of values reported in Table 2 for Examples 1 to 9.

First Overcoating Sequence

2×(OC/2, ad, 5@250, $H_2O$, 5@250)

That is, apply overcoating solution diluted 1:2, air dry, bake 5 minutes at 250° C., allow to cool, rinse in tap water, place in furnace for an additional 5 minutes at 250° C., allow to cool, and execute this entire sequence twice.

2×(OC, ad, 5@250, $H_2O$, 5@250)

As above, but use undiluted overcoating solution.

Bake 15 minutes in air at 425° C.

2×(OC, ad, 5@425, $H_2O$, 5@425)

As above, except furnace temperature is now 425° instead of 250°.

The number of overcoats applied at this stage was typically two, but was increased if needed to provide the desired surface texture: smooth but not necessarily slick to the touch when wet. The acceptable range of coat weight for this sequence encompasses the range of corresponding values reported in Table 2. The desired overcoat weight is greater using the high Bi content overcoats (Examples 6, 7, 8 and 9), because the density of the solid deposited is substantially larger.

Break in overnight by operating electrode overnight at 81A $m^{-2}$ in 21 mN NaCl.

Second Overcoating Sequence

After the initial break-in, apply more overcoat:

2×(OC, ad, 5@425, $H_2O$, 5@425)

The number of overcoats applied at this stage was typically two, but was increased if needed to provide the desired surface texture: smooth and slick after being washed and dried, with the appearance of ice-crusted snow when observed using a metallographic microscope. The acceptable range of coat weight for this sequence encompasses the range of corresponding values reported in Table 2.

Break in overnight as above.

Coating Solutions and Slurries

In all cases the concentration of HCl indicated corresponds to the amount of 12N HCl added in compounding the recipe, exclusive of any HCl that may be produced by hydrolysis of the other ingredients. The number following the slash in the designation of each precoating solution and seal coating solution is the concentration of HCl it contains.

The concentration of wetting agent is not critical; enough wetting agent should be added to provide good wetting, but not much more. Some amount of antifoaming agent was added to many of these solutions, using the minimum amount needed to surpress foam while coating the electrodes.

Precoating Solution Ir-37Ta/3

This solution contains 27.7 mM Ir, 16.0 mM Ta, and 0.02% wetting agent in 3N HCl. Start by dissolving required amount of $TaCl_5$ in c. HCl, add required amounts of Iridium Chloride stock solution and wetting agent, and add water to make the final volume desired.

Precoating Solution Ir-27Ta/4

This solution contains 72.3 mM Ir, 26.5 mM Ta and 0.02% wetting agent in 4N HCl. Compound it as above.

Precoating Solution Ir-33Ta/4

This solution contains 60 mM Ir, 30 mM Ta and 0.02% wetting agent in 4N HCl. Compound it as above.

Precoating Solution Ir -27Sn-3Bi/0.5

This composition contains 30.6 mM Ir, 11.8 mM Sn, 1.3 mM Bi, 0.5 M HCl and 0.1 M $HNO_3$. To make 1 L, combine:

About 0.5 L water 2.0 mL of 10% wetting agent 41.7 mL c. HCl 6.3 mL c. $HNO_3$ 52.5 mL Seal Coating Solution $SnO_2$-10Bi/0.5

40.8 g Iridium chloride stock solution

Add water to make 1 L total volume

Preocoating Solution Ir-30Sn/0.5

Prepare a 0.25M solution of tin(IV) chloride in 0.5 N HCl, and use it in place of Seal Coating Solution $SnO_2$-10Bi/0.5 in the recipe above.

Preocoating Solution Ir-27Sn-3Sb/0.6

Use Seal Coating Solution $SnO_2$-10Sb/1.7 in place of Seal Coating Solution $SnO_2$-10Bi/0.5 in the recipe above.

Seal Coating Solution $SnO_2$-10Bi/0.5

This solution contains 225 mM Sn and 25 mM Bi in 0.5M HCl. To make 1L:

Dissolve 5.82 g $Bi_2O_3$ in 41.7 mL c.HCl

Add 26.3 mL $SnCl_4$ (anhydr.)

Add part of water and 5 mL of 10% wetting agent, mix to dissolve

Add water to make 1 L

Seal Coating Solution $SnO_2$-10Sb/1.7

This solution contains 225 mM Sn and 25 mM Sb in 1.7 M HCl. To make 1 L:

Dissolve 3.64 g $Sb_2O_3$ in 140 mL c.HCl

Add 78.9 g $SnCl_4.5H_2O$

Add part of water and 5 mL of 10% wetting agent, mix to dissolve

Add water to make 1 L

Over Coating Solution Pure $TiO_2$

Dilute Ti Glycolate Stock Solution to 0.25M Ti content, add 10% wetting agent and 10% antifoaming agent as needed Over Coating Solution TiO$_2$-4Bi This solution contains 240 mM Ti and 10 mM Bi. To make 1 L:

Dissolve 4.00 g Bismuth citrate in 30 mL 1N NH$_4$OH
Add part of water and
10 mL 10% wetting agent
1 mL 10% antifoaming agent
Amount of Ti Glycolate stock solution containing 0.24 moles Ti
Add water to make 1 L final volume Over Coating Solution TiO$_2$-10Bi This solution contains 225 mM Ti and 25 mM Bi. Adjust recipe above to provide 225 mM Ti and 25 mM Bi in resulting solution, also increasing amount of ammonium hydroxide in proportion with bismuth citrate. (Mole ratio of NH$_4$OH to BiCitrate is 3:1 in overcoat recipes following as well.)

Over Coating Solution TiO$_2$-33Bi

Adjust recipes above to provide 160 mM Ti and 80 mM Bi in resulting solution.

Over Coating Solution TiO$_2$-40Bi

Adjust recipes above to provide 150 mM Ti and 100 mM Bi in resulting solution.

Over Coating Solution TiO$_2$-50Bi

Adjust recipes above to provide 125 mM Ti and 125 mM Bi in resulting solution.

Over Coating Solution TiO$_2$-25Bi-25 Na

Adjust recipes above to provide 125 mM Ti and 62.5 mM Bi in resulting solution. Also add sodium acetate trihydrate to provide 62.5 mM sodium acetate in the solution.

Over Coating Solution TiO$_2$-12Sb

This solution can be made following the procedure described in U.S. Pat. No. 6,589,405 at 13:28-50, with the amounts of titanium glycolate solution and antimony tartrate solution adjusted to provide the composition 220 mM Ti+30 mM Sb.

Coating Solution SnO$_2$-11Sb in n-Butanol

This solution contains approximately 0.473M SnCl$_4$, 0.059M SbCl$_3$ and 0.57M HCl in n-butanol. It is based on the recipe provided by Dietrich in U.S. Pat. No. 5,364,509 Example 1, modified by using Sb$_2$O$_3$ in place of SbCl$_3$. To make 28 mL, dissolve 0.24 g Sb$_2$O$_3$ in 1.33 mL c.HCl, add 25 mL n-butanol and 1.55 ml SnCl$_4$ (anhydr.).

"Wash Precipitate" Defined

In the recipes below, the expression "wash" precipitate, powder or slurry means: Disperse the material in a convenient volume of water, then centrifuge and discard the supernatant liquid. Repeat until the conductivity of the supernatant does not exceed 3× the conductivity of tap water.

White Slurry Pure TiO$_2$

To make slurry containing 0.1 mole Ti, dissolve 0.218 moles sodium carbonate in 115 mL water using magnetic stirrer, then slowly add 59.8 mL of titanyl sulfate solution while stirring. Add antifoaming agent as needed to collapse froth. When addition is complete, verify that pH is between 6 and 8, adding sodium carbonate or sulfuric acid if necessary. Centrifuge resulting slurry once, without adding water; do not wash. Dry precipitate at about 130° C., crush lightly, transfer to quartz beaker, then bake 45 minutes at 830° C. in air. When cool, wash the product. Disperse washed precipitate in about 150 mL of water, add a bit of antifoaming agent, and ball-mill overnight or longer using 6 mm alumina balls. Drain the milled slurry from balls. Perform gravimetric analysis, and add water to make total concentration of TiO$_2$ in the slurry 0.3 moles/L=24.0 g/L. Immediately prior to use, shake or stir slurry as needed to redisperse it, and add tetramethylammonium hydroxide dropwise to give pH about 11.

Slurry applied to the electrode should cover the surface completely within a few coats, without forming visible clumps. If necessary, prolong milling, adjust pH or dilute the slurry to improve coating behavior.

White Slurry TiO$_2$-4Bi

This slurry contains 4 mole % Bi. To make 0.1 mole of slurry, dissolve 0.93 g Bi$_2$O$_3$ in 57.4 mL of titanyl sulfate solution by stirring until nearly clear, then slowly add this solution to a solution of 0.209 mole sodium carbonate in 115 mL of water and continue as above. Metal oxides in final product=0.3 moles/L=25.9 g/L and pH 11.

White Slurry TiO$_2$-10Bi

This slurry contains 10 mole % Bi. To make 0.1 mole of slurry, add 4.85 mL of 9N H$_2$SO$_4$ to 53.8 mL of titanyl sulfate solution, then follow procedure above using 2.33 g Bi$_2$O$_3$ and 0.218 mole sodium carbonate. Metal oxides in final product=0.3 moles/L and pH 11.

White Slurry TiO$_2$-4Sb

Follow recipe for TiO$_2$-4Bi slurry above, using 1.20 g of antimony triacetate (anhydrous) in place of the Bi$_2$O$_3$.

Blue Slurry TiO$_2$-4Nb

Carefully add 89 mL c. H$_2$SO$_4$ to 89 mL water, stir, and set aside until cool. In a porcelain evaporating dish, mix 21.2 gm Nb$_2$O$_5$ with 69.8 gms of K$_2$SO$_4$. Add 22 mL c. H$_2$SO$_4$ to the solids, and mix to form a uniform paste. Heat the paste for about 15 minutes at 650° C. in air under an exhaust hood until it fuses to form a transparent yellow liquid. Pour the melt into a cool metal pan and swirl to produce thin glassy sheets. Crush the glassy product to a coarse powder, then combine it with the 50% solution of H$_2$SO$_4$. Shake and stir to dissolve the crushed glass as much as possible; dissolution will be incomplete, and a sticky white slurry will be produced. Mix this slurry with 2.356 L titanyl sulfate solution in a plastic pitcher. Stir well to dissolve as much of the niobium slurry as possible, and allow the mixture to stand overnight.

Combine about 800 g of ice with 1.366 L c. NH$_4$OH in a plastic bucket. Slowly add the acid solution to the bucket with brisk stirring, while monitoring pH to make sure it does not drop below 6. Adjust final pH to about 7 adding ammonium hydroxide or sulfuric acid. A flocculant slurry of metal hydroxides is produced.

Remove about ⅓ of the product slurry and combine this portion with an equal volume of water. Let both portions of the slurry (that is, diluted and undiluted) settle, decant and discard the supernatant liquid, centrifuge the precipitate, and discard the supernatant. Do not wash.

Heat the two precipitates at about 130° C. until dry, pulverize them, and combine them. Heat the mixed powder at 250° C. for 45 minutes. Wash the powder, heat at about 130° C. until dry, and pulverize it.

Heat the powder under hydrogen for 90 minutes at 830° C. to reduce niobium to the +4 valence state. Ball-mill the powder (which is now blue) with water overnight or longer, perform gravimetric analysis, and add water to make total concentration of metal oxides in the resulting blue slurry 0.3 moles/L=24.5 g/L. Adjust pH to about 7.2.

Starting Materials

The actual compositions of purchased solutions of titanyl sulfate and iridium chloride may vary among suppliers and lots. The recipes above are based on the specific compositions set forth following, and should be adjusted as appropriate to accommodate the actual compositions employed. Filtered tap water is or deionized water is used to compound all solutions.

Titanyl Sulfate Solution

This solution is an intermediate in the production of anatase pigment, and was purchased from a manufacturer of anatase. The solution contained approximately 1.67 M $TiO_2$+ 3.65 M $H_2SO_4$ (mole ratio 1:2.18) with specific gravity d=1.35 kg/L.

Iridium Chloride Stock Solution

A purchased solution of $H_2IrCl_6$ with d=1.360 containing 14.4% by weight Ir=0.749 moles/kg=1.02 M.

10% Wetting Agent

Dilute100 g polyoxyethylene (10) isooctylphenyl ether (commonly sold under the trade name X-100) to 1 L with water.

10% Antifoaming Agent

Dilute 100 g antifoaming agent that contains 10% polydimethylsiloxane to 1 L with water.

Titanium Glycolate Stock Solution

To make titanium glycolate solution containing 500 g=6.22 moles $TiO_2$ chelated and solubilized by an equivalent amount of glycolic acid:

Combine 3.75 L of titanyl sulfate solution with an equal volume of water. Combine 2.04 L of 50 w % KOH with 820 g of ice in a 5 gallon plastic bucket. Slowly add the diluted titanyl sulfate solution to the bucket while mixing. Do not allow pH to drop below 7, adding more KOH if necessary.

Wash the resulting slurry, and combine the washed precipitate with 544 mL of 11.5M glycolic acid. Maintain at 75° C., stirring occasionally, until the precipitate dissolves, forming a cloudy yellowish solution. Complete dissolution typically requires 2-3 days. Perform gravimetric analysis to determine $TiO_2$ content; about 1M is typical.

Test Procedures

Electrode Test Procedures

Unless otherwise noted, electrodes were tested at a current density of 81 A $m^{-2}$ in a solution comprising 21 mN NaCl dissolved in tap water.

A small electrode measuring 57×146 mm (2.25×5.75 inches) was tested using two cathodes made of Hastelloy C-22, with electrode spacing of 3.0 mm=0.12 inch in a test cell with rapid forced flow between the electrodes and electrolyte volume of 500 mL. The cathodes were masked with electrical tape to provide a working area of 57×114 mm on either face of the anode. To ensure good mass transfer at the surface of the anode, a rectangle of fine polypropylene mesh was pressed against either side of the anode to act as a turbulence promoter.

True Cell Voltage

The voltage reported is true cell voltage, measured without the polypropylene mesh between anode and cathode, and corrected for IR drop within the electrolyte:

$$E_{cell}=E_{a-c}-id/\kappa$$

where $E_{a-c}$ is the voltage measured between anode and cathode after 1 minute of operation, i is the current density (usually 81 A $m^{-2}$ of active anode surface), d is the distance between electrodes, and κ is the conductivity of the electrolyte, measured just before turning on current.

Current Yield

Current yield was determined using 1,2-propanediol (that is, propylene glycol) as the test substrate. Enough propylene glycol (1.64 mL/L) was added to the electrolyte (usually 21 mN NaCl) to provide initial COD=2.80 g/L. The test cell used with the small electrodes was operated for 90 minutes at 1 ampere with 0.50 L electrolyte; at 100% current yield, 0.447 g COD would be removed under these conditions. The electrolyte was sampled before and after, the samples diluted 1:2, and COD determined using calorimetric COD vials of 0-1, 500 ppm range. Large electrodes were tested using "safe" antifreeze containing 95% propylene glycol as the test substrate with the same initial COD, and reaction time selected to provide the same depth of oxidation (that is, about 10,800 Coulombs per liter of electrolyte) and therefore comparable results.

Gravimetric Determination of Metal Content

To determine total metal content in terms of the equivalent weight of the metal oxide, pipette 1.00 mL of solution or slurry to be analyzed into a tared crucible made of Alloy 600. Carefully boil off water to avoid splattering, then heat uncovered crucible to bright orange for at least one-half minute. Weight of residue in the crucible is proportional to metal content.

Spot Test for Bismuth

To detect Bi at the surface of an electrode, place a few drops of 1N nitric acid on the dry surface of the electrode. After a few minutes, use a fine pipette to transfer 2 drops of the liquid from the electrode surface to a white porcelain spot test plate, and add 2 drops of 10% thiourea in water. A yellow color indicates the presence of Bi; Ti, Sn and Sb do not interfere.

PREFERRED EMBODIMENT, CONCLUSIONS AND RAMIFICATIONS

The most preferred embodiment of the electrode of the present invention is made by applying to a sanded and cleaned Ti-Gr.2 substrate a coating sequence comprising:

Precoating Solution Ir-33Ta/4 (applied using Precoat and Seal Coat Procedure 2),
Seal Coating Solution $SnO_2$-10Bi/0.5,
White Slurry $TiO_2$-4Bi, and
Overcoating Solution $TiO_2$-10Bi in the coat weights shown in Table 2 or greater.

Inert colloidal particles, powders or fibers can be added to the electrocatalytic coating comprising the oxides of Ti and Bi to add strength, increase surface roughness, or for another reason; for example, colloidal silica, zirconia, alumina provided that the amount added does not increase the electrical resistance of the electrocatalytic coating to the point of making the electrode inoperable. Such inert materials can be substituted for all or part of the doped $TiO_2$ slurry; for example, silica powder. They can also be produced in situ, by adding the including the appropriate precursor compounds to the overcoating solution; for example, zirconium acetate. The coating can also be sealed using fluorocarbon resins or similar materials to decrease its porosity utilizing methods known in the art.

Antimony can be substituted for part or all of the bismuth in the seal coat. A seal coat with neither Bi nor Sb added can also be used, rendered conductive by the small amount of Sn in the +2 valence state or residual chloride that will normally be present, or by adding other doping elements known it the art.

These electrode preferably are made by applying the coating sequence indicated to a Ti-metal substrate, but other valve metal substrates or their suitable alloys can be used as well.

Most preferably, a sheet of Ti-Gr.2 is coated on both sides to produce a monopolar electrode (anode). One or more anodes of this description can be combined with suitable cathodes (preferably stainless steel) in an electrolytic cell of conventional design as are known in the art. In combination with a suitable power supply, this electrolytic cell can be used to purify water or detoxify hazardous waste by degrading organic substances dissolved or dispersed in the water. The current density employed can vary over a wide range, but is preferably within the range of 40 to 160 Amperes per square meter. Electrodes of the present invention can also be made by applying the coating sequence indicated to Ti-metal substrates of different physical form; for example, expanded metal mesh as described by Coin in U.S. Pat. No. 5,783,050, or the high surface, fiber wound electrode provided by Weres and O'Donnell in Patent Application Publication US 2004/0003993 (allowed and will issue in late 2006).

The water electrochemically purified must contain some dissolved electrolytes to confer some degree of electrical conductivity. Preferably, the total concentration of electrolytes present should be least 5 mN, and ideally the total concentration of electrolytes present is in the range of 10 to 100 mN. Chloride salts are preferred because they are conducive to high current yield, and hypochlorite produced as a byproduct kills any microorganisms that may be present. The process may be operated at somewhat lower or much higher electrolyte concentrations as well, and other electrolytes may be present in solution. However, the electrolytes containing fluoride salts and characterized by pH less than about 2 should be avoided, as the coated titanium anodes may be damaged under these conditions.

The electrodes of the present invention can also be made without a metallic substrate in the form of a sintered body of titanium dioxide doped with bismuth, produced as described by Mochel in U.S. Pat. No. 2,490,825 optionally also including a suitable shrinkage agent in the composition.

Although the description above contains many specificities, these should not be construed as limiting the scope of the invention but merely as providing examples of some of the presently preferred embodiments. Thus the scope of the invention should be determined by the appended claims and their legal equivalents, rather than by the examples given. While I believe the explanations given to be true, I do not wish to be bound by my interpretations.

The invention claimed is:

1. An electrode for electrolysis, characterized by a value of current yield and comprising
    a valve metal substrate, and
    an outermost electrocatalytic coat comprising the oxides of titanium and bismuth, and having
        a mole fraction of bismuth in said outermost electrocatalytic coat, and
    wherein
        the concentration of platinum group metals and other harmful constituents present in said outermost electrocatalytic coat is insufficient to significantly decrease the current yield of said electrode, and
    wherein
        wherein the aggregate mole fraction of Ba, Ga, Ge, Pb, Bi, Se, Te, Cu, Cd, the rare earth elements, Mn, Fe, Co and Ni in said outermost electrocatalytic coat is less than about 50 mole percent,
    whereby an electrode able to oxidize organic substances dissolved or dispersed in water in a nonselective manner and with good current yield is provided.

2. The electrode of claim 1, also having an antipassivation layer applied to said valve metal substrate underneath said outermost electrocatalytic coat,
    whereby the service life of said electrode is improved.

3. The electrode of claim 2 wherein said valve metal substrate is selected from the group consisting of titanium and titanium alloys.

4. The electrode of claim 3, wherein said antipassivation layer contains iridium.

5. The electrode of claim 4, further provided with an intermediate seal coat comprising tin dioxide and applied between said antipassivation coat and said outermost electrocatalytic coat.

6. The electrode of claim 5, wherein said mole fraction of bismuth is said outermost electrocatalytic coat does not exceed 25 percent.

7. The electrode of claim 6, wherein said seal coat comprises tin dioxide doped with bismuth.

8. The electrode of claim 6, wherein said mole fraction of bismuth in said outermost electrocatalytic coat is between 2 percent and 16 percent.

9. A electrochemical water purification process wherein the water purified contains
    electrolytes and
    contaminants chosen from the class comprising
        organic substances dissolved or dispersed in the water, and
        oxidizable inorganic substances dissolved in the water,
    said process comprising the step of
        oxidizing said contaminants by passing an electric current from an anode through said water to a cathode,
    wherein
        said anode is characterized by a value of current yield, and
        has an outermost electrocatalytic surface composition comprising the oxides of titanium and bismuth and having a mole fraction of bismuth,
    whereby said contaminants are oxidized and degraded with good current efficiency.

10. The electrochemical water purification process of claim 9, wherein said anode comprises a sintered electrically conductive body comprising the oxides of titanium and bismuth.

11. The electrochemical water purification process of claim 9, wherein said anode further comprises a valve metal substrate.

12. The electrochemical water purification process of claim 10, wherein said valve metal substrate comprises a material chosen from the class consisting of titanium and titanium alloys.

13. The electrochemical water purification process of claim 12, wherein said anode further comprises an antipassivation layer applied to said valve metal substrate underneath said electrocatalytic surface composition.

14. The electrochemical water purification process of claim 13, wherein said antipassivation layer contains iridium, and wherein said anode is also provided with a an intermediate seal coat layer comprising tin dioxide.

15. The electrochemical water purification process of claim 14, wherein said mole fraction of bismuth in said electrocatalytic surface composition does not exceed 25 percent, and the aggregate amount of platinum group metals and other harmful constituents in said electrocatalytic surface composition is insufficient to significantly decrease the current yield of said anode.

16. The electrochemical water purification process of claim 15, wherein said mole fraction of bismuth in said electrocatalytic surface composition is between 1 and 10 percent.

17. The electrochemical water purification process of claim 15, wherein chloride salts are the predominant electrolytes present in the water being treated.

18. An electrode for electrolysis characterized by a value of current yield and comprising a sintered body comprising the oxides of titanium and bismuth, wherein the concentration of platinum group metals and other harmful constituents in said sintered body is insufficient to significantly decrease the current yield of said electrode.

* * * * *

UNITED STATES PATENT AND TRADEMARK OFFICE
CERTIFICATE OF CORRECTION

| | |
|---|---|
| PATENT NO. | : 7,494,583 B2 |
| APPLICATION NO. | : 11/427707 |
| DATED | : February 24, 2009 |
| INVENTOR(S) | : Oleh Weres |

Page 1 of 1

It is certified that error appears in the above-identified patent and that said Letters Patent is hereby corrected as shown below:

In the Specification:

At column 5, line 7 replace "(Ta2O$_5$)" with -- (Ta$_2$O$_5$) --.

At column 5, line 20 replace "(Bi$_2$O3)" with -- (Bi$_2$O$_3$) --.

At column 7, line 12 replace "improve" with -- improves --.

At column 10, line 56 replace "dry dry" with -- dry --.

At column 17, lines 24–25 replace "Patent Application Publication US 2004/0003993 (allowed and will issue in late 2006)" with -- US Patent 7,077,937 --.

In the Claims:

In claim 1, at column 18, lines 1–2 replace "wherein wherein" with -- wherein --.

In claim 6, at column 18, line 24 replace "is" with -- in --.

In claim 9, at column 18, line 34 replace "comprising" with -- consisting of --.

In claim 12, at column 18, line 57 replace "claim 10" with -- claim 11 --.

Signed and Sealed this
Fourteenth Day of October, 2014

Michelle K. Lee
*Deputy Director of the United States Patent and Trademark Office*